US009329256B2

(12) United States Patent
Dolce

(10) Patent No.: US 9,329,256 B2
(45) Date of Patent: May 3, 2016

(54) SHADOW BAND PYRANOMETER WITH SHADOW BAND SUPPORT

(71) Applicant: AccuFlux Inc., Bohemia, NY (US)

(72) Inventor: Robert Dolce, Manorville, NY (US)

(73) Assignee: AccuFlux Inc., Bohemia, NY (US)

( * ) Notice: Subject to any disclaimer, the term of this patent is extended or adjusted under 35 U.S.C. 154(b) by 297 days.

(21) Appl. No.: 14/052,702

(22) Filed: Oct. 12, 2013

(65) Prior Publication Data

US 2014/0034805 A1  Feb. 6, 2014

Related U.S. Application Data

(63) Continuation of application No. 13/918,975, filed on Jun. 16, 2013, now Pat. No. 8,648,286, and a continuation of application No. 12/706,919, filed on Feb. 17, 2010, now Pat. No. 8,481,905.

(51) Int. Cl.
*G01J 1/20* (2006.01)
*G01S 3/786* (2006.01)
(Continued)

(52) U.S. Cl.
CPC .............. *G01S 3/7861* (2013.01); *F24J 2/5417* (2013.01); *G01J 1/02* (2013.01); *G01J 1/0271* (2013.01);
(Continued)

(58) Field of Classification Search
CPC .............. F24J 2/5417; F24J 2/38; F24J 2/54; F24J 2/5403; F24J 2/5406; F24J 2/5413; G01J 1/00; G01J 1/02; G01J 1/0271; G01J 1/42; G01J 2001/4266; G01J 2001/4276; G01J 2001/428; G01J 2001/4285; G01S 3/7861

USPC .......... 250/203.4; 126/576; 136/213; 236/69
See application file for complete search history.

(56) References Cited

U.S. PATENT DOCUMENTS 4,107,521 A * 8/1978 Winders ..................... F24J 2/38
126/577
4,672,191 A * 6/1987 Cofield ....................... F24J 2/38
250/203.4
(Continued)

FOREIGN PATENT DOCUMENTS

IT  1239806 B  11/1993
JP  11083622 A  3/1999
(Continued)

OTHER PUBLICATIONS

Instructions for Installation and Operation of the Eppley Shadow Band Stand for theMeasurement of Diffuse Sky Radiation, Dec. 8, 2003, Eppley Laboratory Inc., Newport, RI.
(Continued)

*Primary Examiner* — Georgia Y Epps
*Assistant Examiner* — Kevin Wyatt
(74) *Attorney, Agent, or Firm* — Stone Creek Services LLC; Alan M Flum

(57) ABSTRACT

A shadow band assembly includes a platform and an arcuate shadow arm extending upward from the platform and terminating in a free end above the platform. A sun sensor mounting location is located below the free end of the shadow arm. The arm is preferably further supported by a vertical strut. According to other embodiments, the arm is hollow and contains a fluid conduit and/or an electrical cable. A sun sensor may be mounted on top of the free end of the arm and a fluid nozzle may be mounted under the free end. A shadow band pyranometer includes the shadow band assembly, a sun sensor mounted at the mounting location and a motor drive coupled to the platform for azimuth tracking Additional sensors with zenith tracking may also be provided.

9 Claims, 7 Drawing Sheets

(51) Int. Cl.
*G01J 1/02* (2006.01)
*G01J 1/42* (2006.01)
*F24J 2/38* (2014.01)
*F24J 2/46* (2006.01)
*F24J 2/54* (2006.01)

(52) U.S. Cl.
CPC *G01J 1/4228* (2013.01); *F24J 2/38* (2013.01); *F24J 2/461* (2013.01); *F24J 2/54* (2013.01); *G01J 2001/4285* (2013.01)

(56) References Cited

U.S. PATENT DOCUMENTS

| 6,849,842 | B2 | 2/2005 | Little | |
|---|---|---|---|---|
| 8,981,272 | B2* | 3/2015 | Armstrong | G01J 1/42 250/203.4 |
| 2007/0033828 | A1 | 2/2007 | Hartkop et al. | |
| 2008/0001059 | A1 | 1/2008 | Wang | |
| 2009/0272375 | A1 | 11/2009 | Pedretti | |
| 2009/0314280 | A1* | 12/2009 | Banerjee | F24J 2/12 126/606 |

FOREIGN PATENT DOCUMENTS

| NL | 2006209 | A | 8/2011 |
|---|---|---|---|
| SU | 1578503 | A | 7/1990 |

OTHER PUBLICATIONS

"2 AP Two Axis Sun Tracker Instruction Manual", Jun. 13, 2008, pp. 37-43, Kipp and Zonen, Bohemia, NY.
Search Report and Written Opinion, Dutch Patent Application No. NL2006209, Sep. 19, 2012, Netherlands Ministry of Economic Affairs, Agriculture and Innovation.
Robert Dolce, inventor's solar shadow band tracker, installed and photographed on Feb. 18, 2009, installation site: Pomona, California. Precision Solar Technologies Website, Internet Archive Capture from Apr. 20, 2009, Accessed on the Internet at: http://web.archive.org/web/20090420132039/http://tapthesun.com/. Note that the photograph of the Solar Shadow Band Tracker is the inventor's Robert Dolce from his Pomona California Installation on Feb. 18, 2009.
Precision Solar Technologies Website, Internet Archive Capture from Apr. 21, 2009, Accessed on the Internet at: http://web.archive.org/web/20090421120900/http://tapthesun.com/R&D%20-%20Prospector%20-%20Main.html. Note that the photograph of the Solar Shadow Band Tracker is the inventor's Robert Dolce from his Pomona California Installation on Feb. 18, 2009.
Rotating Shadow Band Radiometer YES MFR-7, Internet Archive Capture from Sep. 15, 2003. Accessed on the Internet at: http://web.archive.org/web/20030915004906/http://www.eoc.csiro.au/instrument/html/terrestrial/yes_mrf7.htm.
Solar Prospector Series: Installation and Operation Guide, p. 6, Jul. 16, 2009, Precision Solar Technologies, Tijeras, NM.
Milestones, Solar Radiation Instrumentation Tracking, p. 11, Precision Solar Technologies Website, Internet Archive Capture from Mar. 22, 2006, Accessed on the Internet at: http://web.archive.org/web/20060322163758/http://tapthesun.com/HTML/Development%20Milestones/TTS%20SolarTrak%20Milestones%20Page%2011.htm.
Photograph of inventor's device at fabricator's facility during testing, Nov. 25, 2009, Precision Solar Technologies Website, captured on the Internet at http://www.tapthesun.com/Images/WL%20Size/SR1_3%20-%20WL.JPG.
Norbert Geuder, Benedikt Pulvermuller, Oliver Vorbrugg, Corrections for Rotating Shadowband Pyranometer Solar Resource Assessment, Proceedings of SPIE, Aug. 28, 2008, p. 3 of article, vol. 7046, The International Society for Optical Engineering. Society of Photo-Optical Instrumentation Engineers, Bellingham, WA.
N. Gueder, F. Trieb, C. Schillings, R. Meyer, V. Quaschning, Comparision of Different Methods of Measuring Solar Irradiation Data, Feb. 19, 2003, p. 2, 3rd International Conference on Experiences with Automatic Weather Stations, Torremolinos, Spain.
N. Gueder, V. Quaschning, Soiling of irradiation sensors and methods for soiling correction, Solar Energy, Aug. 15, 2006, pp. 1402-1409, vol. 80, International Solar Energy Society, Freiburg, Germany.
Kevin Wyatt, Non-Final Office Action, U.S. Appl. No. 12/706,919, Date of Action: Dec. 14, 2012, United States Patent and Trademark Office, Alexandria, VA.
Image of a rotating shadow pyranometer accessed on the Internet at: http://www.volker-quaschning.de/fotos/messung/RSP_1024×768.jpg on Oct. 8, 2013.
Kevin Wyatt, Non-Final Office Action, U.S. Appl. No. 13/918,975, Date of Action: Sep. 24, 2013, United States Patent and Trademark Office, Alexandria, VA.
Ruel D. Little, U.S. Appl. No. 10/459,335, Original Drawings filed on Jun. 11, 2003, p. 2, United States Patent and Trademark Office, Alexandria, VA US.
Norbert Geuder, Solar Resources Measurements and Satellite Data, 4th Sfera Summer School 2013, pp. 28-29. CSP Services, Almeria, Cologne Germany. Accessed on the Internet at http://www.slideshare.net/redocs_/solar-resource-measurements on Nov. 22, 2015.

* cited by examiner

SHADOW BAND PYRANOMETER WITH SHADOW BAND SUPPORT

This application is a continuation of U.S. patent application Ser. No. 13/918,975 filed on Jun. 16, 2013, which is a continuation of U.S. patent application Ser. No. 12/706,919, filed on Feb. 17, 2010, now U.S. Pat. No. 8,481,905 issued on Jul. 9 2013. The entire contents of U.S. patent application Ser. No. 13/918,975 and U.S. patent application Ser. No. 12/706,919 are hereby incorporated by reference.

FIELD OF INVENTION

This invention relates broadly to pyranometers. More particularly, this invention relates to shadow band pyranometers for measuring diffuse solar radiation throughout the course of a day.

STATE OF THE ART

Pyranometers are a class of actinometers that measure the combined intensity of solar radiation. Pyranometers are used largely in research, particularly meteorological research. However, they are also used in agricultural and solar energy applications.

A shadow band pyranometer is a conventional pyranometer to which a shadow band has been attached at such an angle that the shadow band blocks out the direct solar radiation throughout the course of a day. A state of the art shadow band pyranometer (available from The Eppley Laboratory Inc., Newport, R.I.) is shown in prior art FIG. 1. The shadow band 1 prevents direct solar radiation from reaching the pyranometer 2. If used in conjunction with a second pyranometer without a shadow band, direct radiation can be calculated by finding the difference between the two pyranometer measurements.

The shadow band 1 is constructed of black anodized aluminum, weighs approximately twenty-four pounds, and uses a three inch wide circular or semi-circular band approximately twenty-five inches in diameter to shade the pyranometer 2. A platform 3 at the center supports the pyranometer 2 in a level position. The height and tilt settings of the shadow band 1 must be adjusted regularly (typically every two days) to compensate for the change in solar declination angle, due to the ongoing orbital and axial change of the Earth. Various setting screws and holes 4 are provided to make this adjustment.

Another type of shadow pyranometer, shown in prior art FIG. 2, uses "shading balls" 5 rather than a band. Such an apparatus is the "Two Axis Sun Tracker" available from Kipp & Zonen USA Inc., Bohemia, N.Y. The Sun Tracker includes a motor drive 6 which can be programmed to track the movement of the sun from east to west during the course of the day. This is tracking on the azimuth axis. The motor drive 6 can also be programmed to track on a second axis, the zenith axis. This second axis tracking automatically repositions the shading balls 5 to compensate for the changing elevation angle of the sun throughout the day. However, the apparatus is extremely complicated and costly.

SUMMARY OF INVENTION

It is therefore an object of the invention to provide an improved shadow band pyranometer.

In accord with these objects, which will be discussed in detail below, a shadow band pyranometer according to the present invention includes a motor driven platform having a centrally located sun sensor. The platform is preferably arranged to be parallel to the ground on which the pyranometer rests. A generally vertical and arcuate shade arm extends upward from and substantially perpendicular to the platform at a distance away from the sensor. The arm traverses an arc of approximately 90 degrees and terminates approximately directly above the sensor. According to the presently preferred embodiment, a vertical strut supports the arm close to its free end. The arm is advantageously hollow and includes space for a fluid conduit and an electrical cable. In the presently preferred embodiment, an additional sun sensor is mounted on the top outer surface of the free end of the arm and is coupled to an electrical cable, which runs through the hollow of the arm to appropriate circuitry. Further, according to the presently preferred embodiment, a fluid-dispensing nozzle is mounted on the bottom of the free end of the arm, approximately opposite to the second sun sensor. The nozzle is fluidly coupled to a fluid conduit (e.g., flexible tube), which extends through the hollow of the arm to a source of cleaning fluid.

It will be appreciated that the shadow arm of the present invention does not need to be adjusted to compensate for the changing declination of the sun. Moreover, the shadow arm of the invention does not cast any shadow on the second sun sensor. Furthermore, the location of the cleaning nozzle allows the first sun sensor to be easily cleaned by injecting cleaning fluid through the nozzle down onto the first sun sensor.

In an exemplary embodiment, a second pair of sensors are mounted via a second tracking motor to the platform and the second tracking motor tracks the zenith movement of the sun with respect to the second unshaded pair of sensors.

According to a presently preferred embodiment, "bird whiskers" are mounted around the second sun sensor to deter birds from perching on the sensor.

The shadow band assembly of the present invention may be retrofitted to existing equipment. As such, the band may be supplied coupled to a platform defining a sun sensor mounting location and having a vertical strut further supporting the shadow band. The shadow band assembly may be supplied with or without sensors and with or without a fluid nozzle.

Certain of the foregoing and related objects are readily attained according to the present invention by the provision of a shadow band assembly, comprising a platform having a sun sensor mounting location defined on said platform, and an arcuate shadow band having a first end and a second end, said first end mounted on said platform at a distance from said sun sensor mounting location, said shadow band extending generally vertically from and perpendicular to said platform with said second end of said shadow band lying above said sun sensor mounting location. Preferably, said arcuate shadow band extends through an arc of approximately 90 degrees, and most advantageously, 92.5 degrees from said first end to said second end.

In a preferred embodiment, said shadow band defines a hollow cavity extending from said first end to said second end. Desirably, a fluid conduit extending through said hollow cavity and, most desirably, a fluid nozzle is coupled to said second end and in fluid communication with said fluid conduit. Most advantageously, an electrical cable extends through said hollow cavity and a sun sensor is mounted on said second end and coupled to said electrical cable.

In a particularly preferred embodiment, a strut stabilizer is provided extending from said platform at a point between said first end and said sun sensor mounting location to said band at a point between said first and second ends. The strut is substantially perpendicular to said platform.

Certain of the foregoing and related objects are also attained in a shadow band pyranometer embodying the present invention, comprising a platform, a first sun sensor mounted on said platform, and an arcuate shadow band having a first end and a second end, said first end mounted on said platform at a distance from said first sun sensor, said shadow band extending generally vertically from and perpendicular to said platform with said second end of said shadow band lying above said first sun sensor. Preferably, a motor drive is coupled to said platform, said motor drive being programmable for azimuth tracking of said platform. Desirably, an unshaded sensor assembly is coupled to said motor drive, said motor drive being programmable for zenith tracking of said unshaded sensor assembly.

Other preferred features of the shadow band pyranometer are described above in relation to the shadow band assembly.

Additional objects and advantages of the invention will become apparent to those skilled in the art upon reference to the detailed description taken in conjunction with the provided figures.

DETAILED DESCRIPTION

Figure 1:
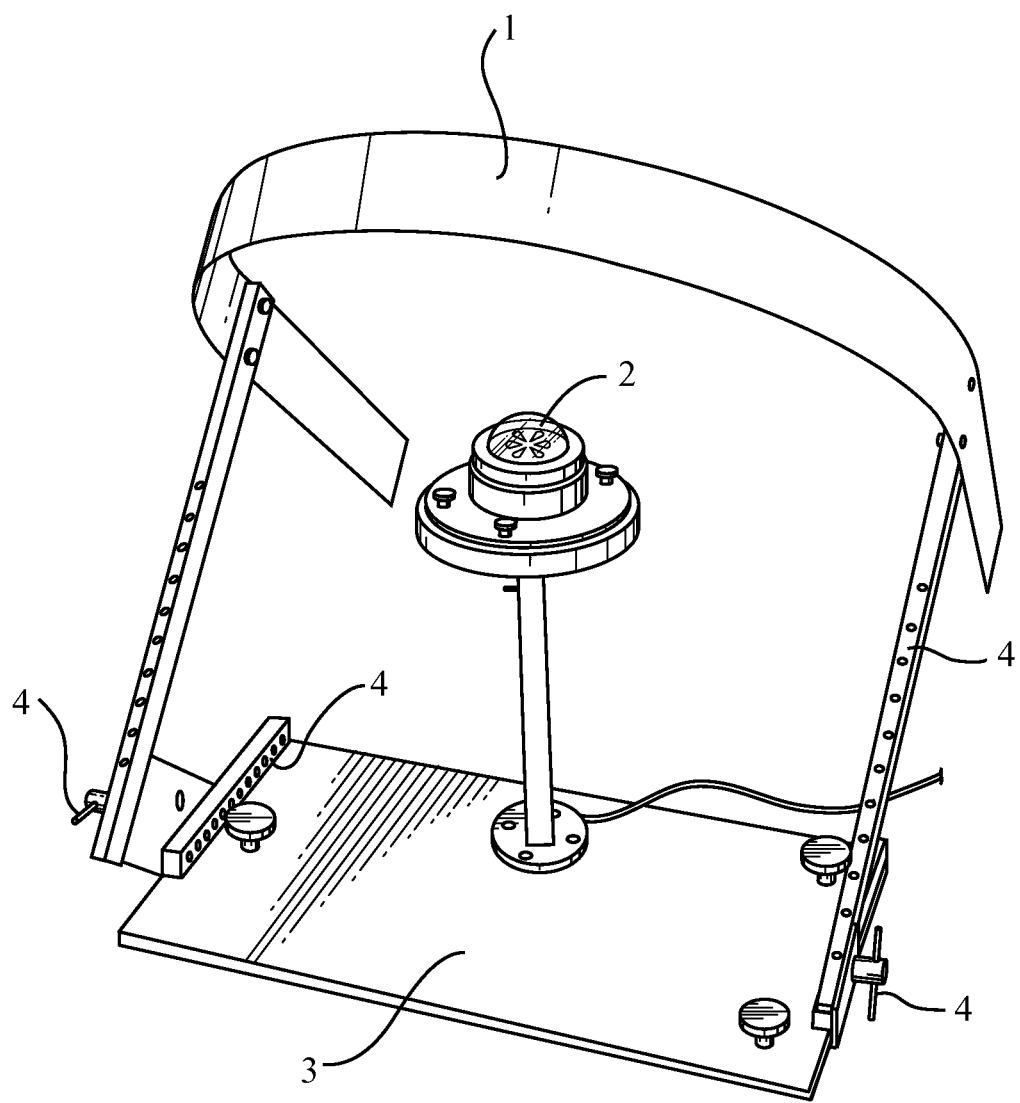
FIG. 1 is a perspective view of a prior art shadow band pyranometer.
Figure 2:
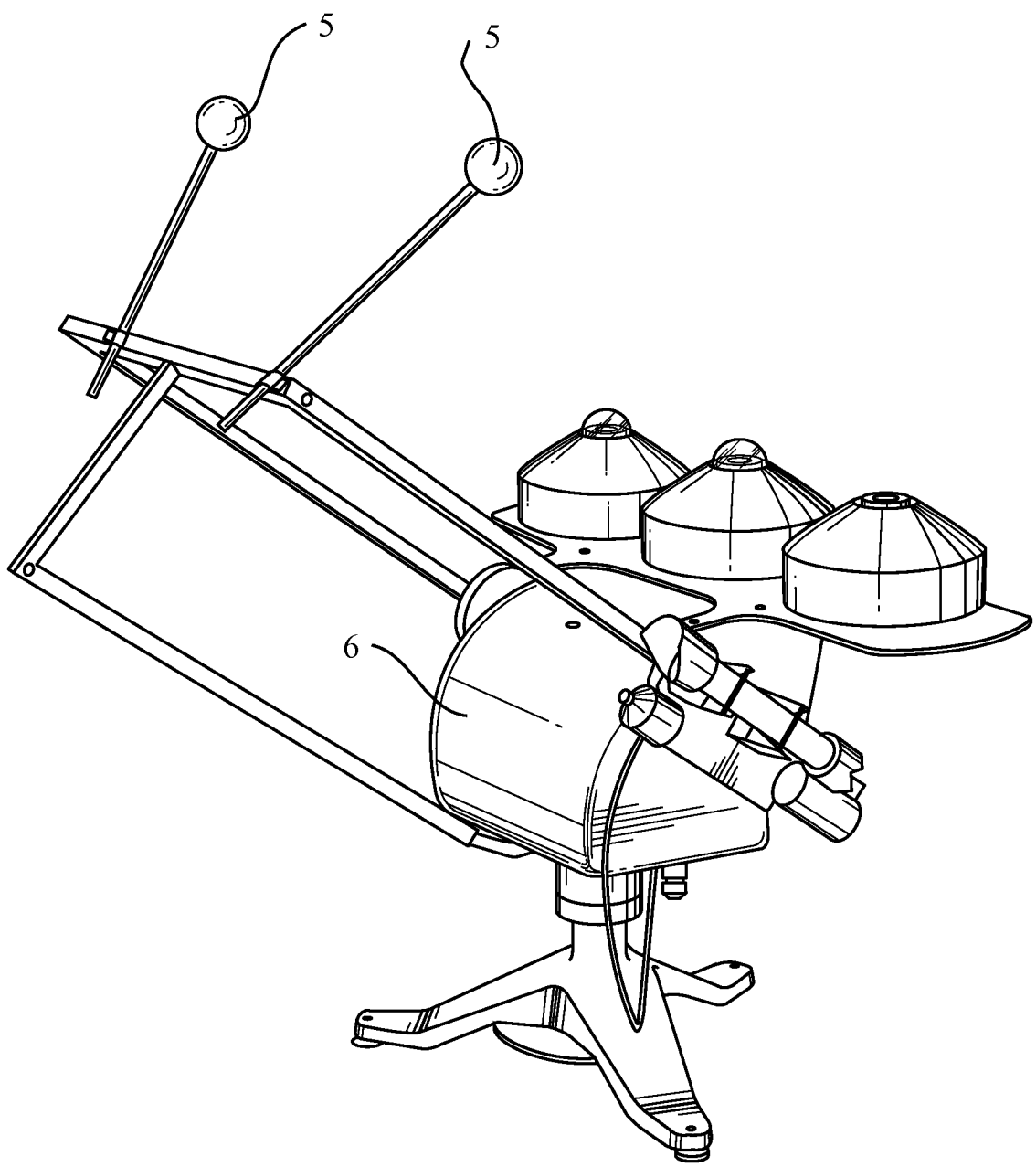
FIG. 2 is a perspective view of a prior art sun tracker with a pyranometer shading ball arrangement.
Figure 3:
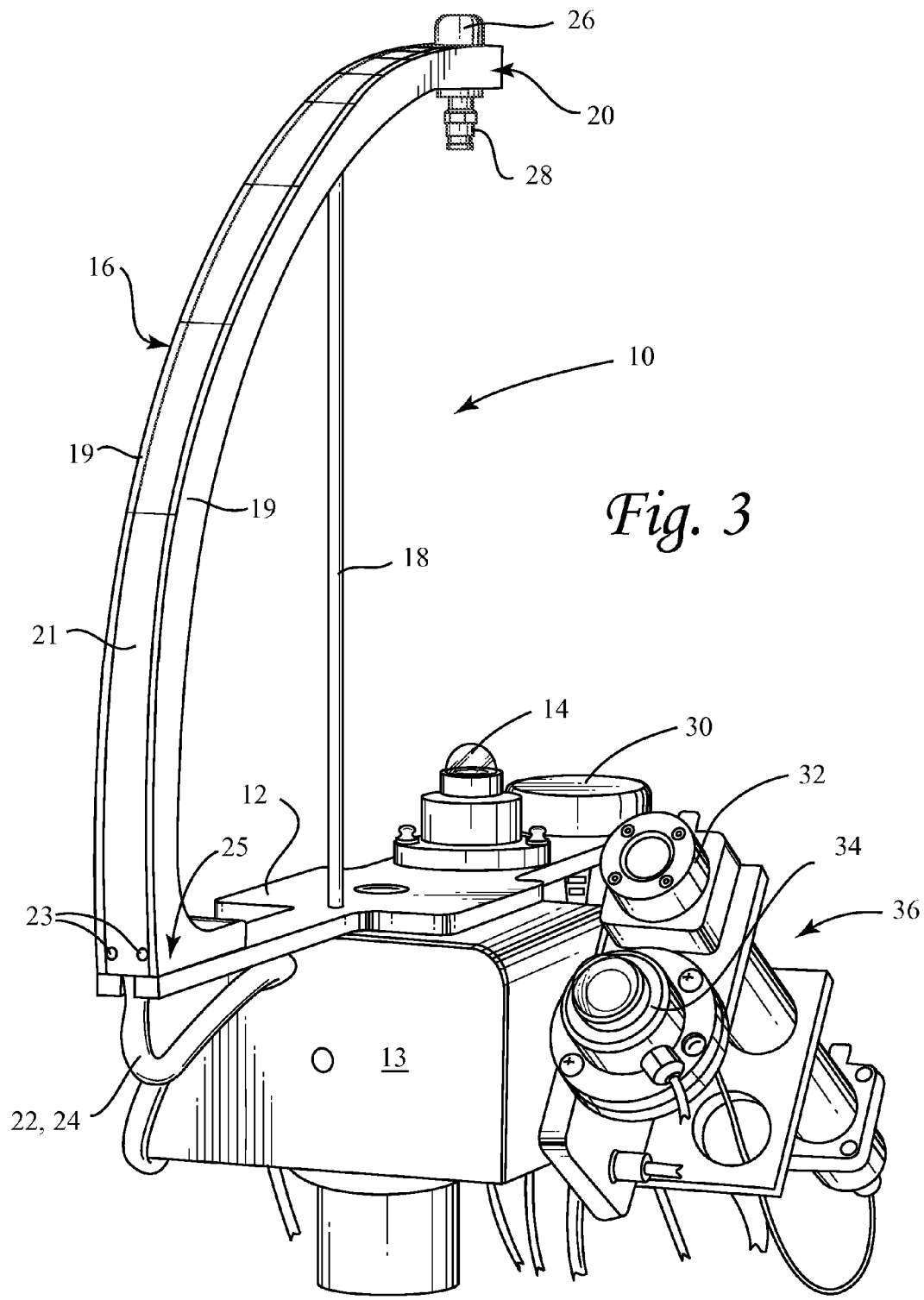
FIG. 3 is a perspective view of a shadow band pyranometer according to the invention.

Turning now to FIG. 3, a shadow band pyranometer 10 according to the present invention includes a motor driven platform 12 having a centrally located sun sensor 14. The platform 12 is mounted on a motor drive unit 13 and is preferably arranged to be parallel to the ground on which the pyranometer rests. A generally vertical and arcuate shade arm (shadow band) 16 extends upward from and substantially perpendicular to the platform 12 at a distance away from the sensor 14. The arm 16 traverses an arc of approximately 90 degrees (preferably 92.5 degrees) and terminates approximately directly above the sensor 14.

Figure 4:
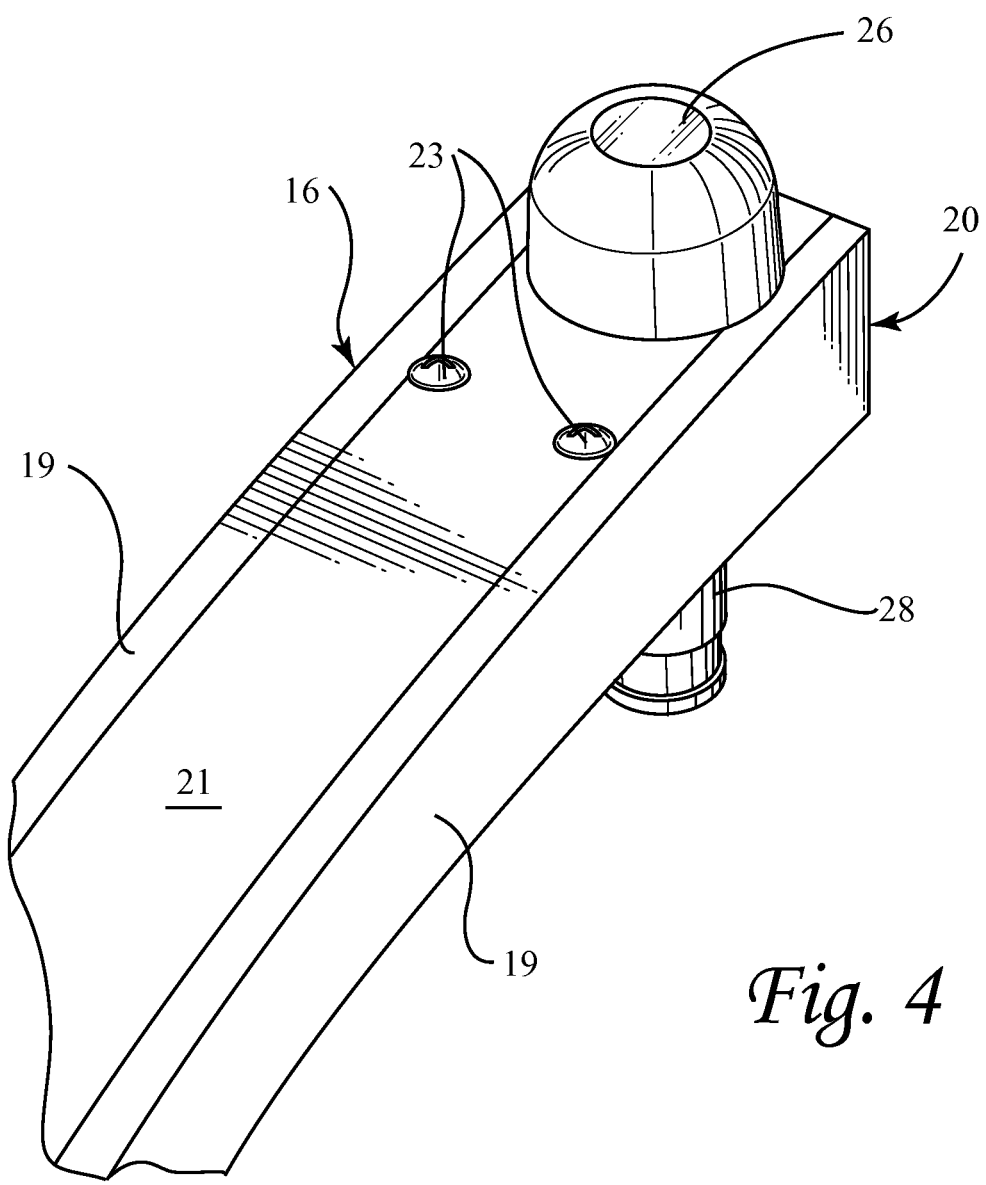
FIG. 4 is a broken perspective view of the free end of the shadow band of the invention.
Figure 6:
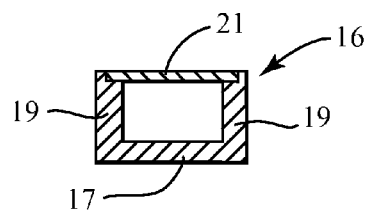
FIG. 6 is a sectional view of the shadow band taken along line 6-6 of FIG. 5.
Figure 5:
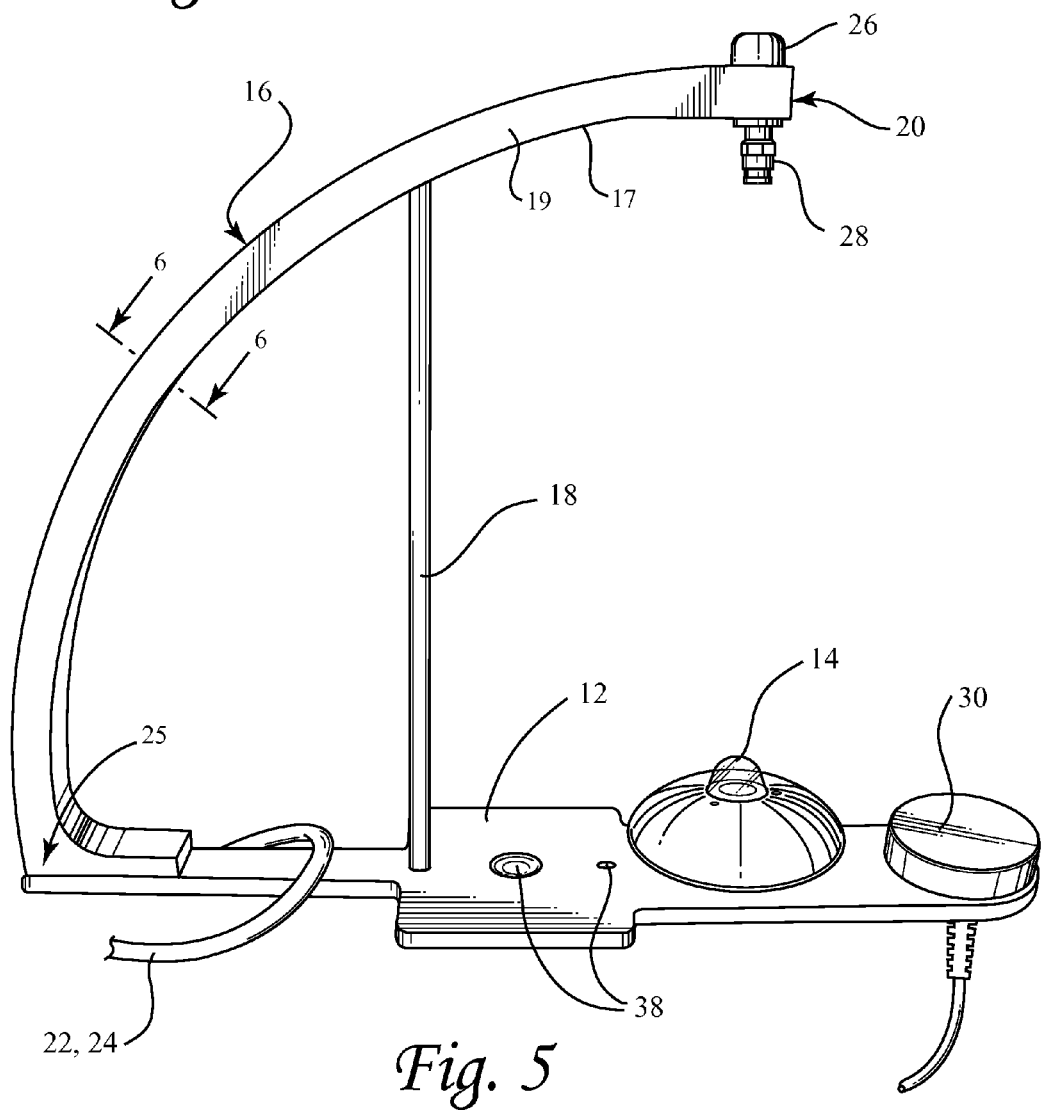
FIG. 5 is a side elevation view of a shadow band assembly of the invention with three sensors and a nozzle attached.
Figure 7:
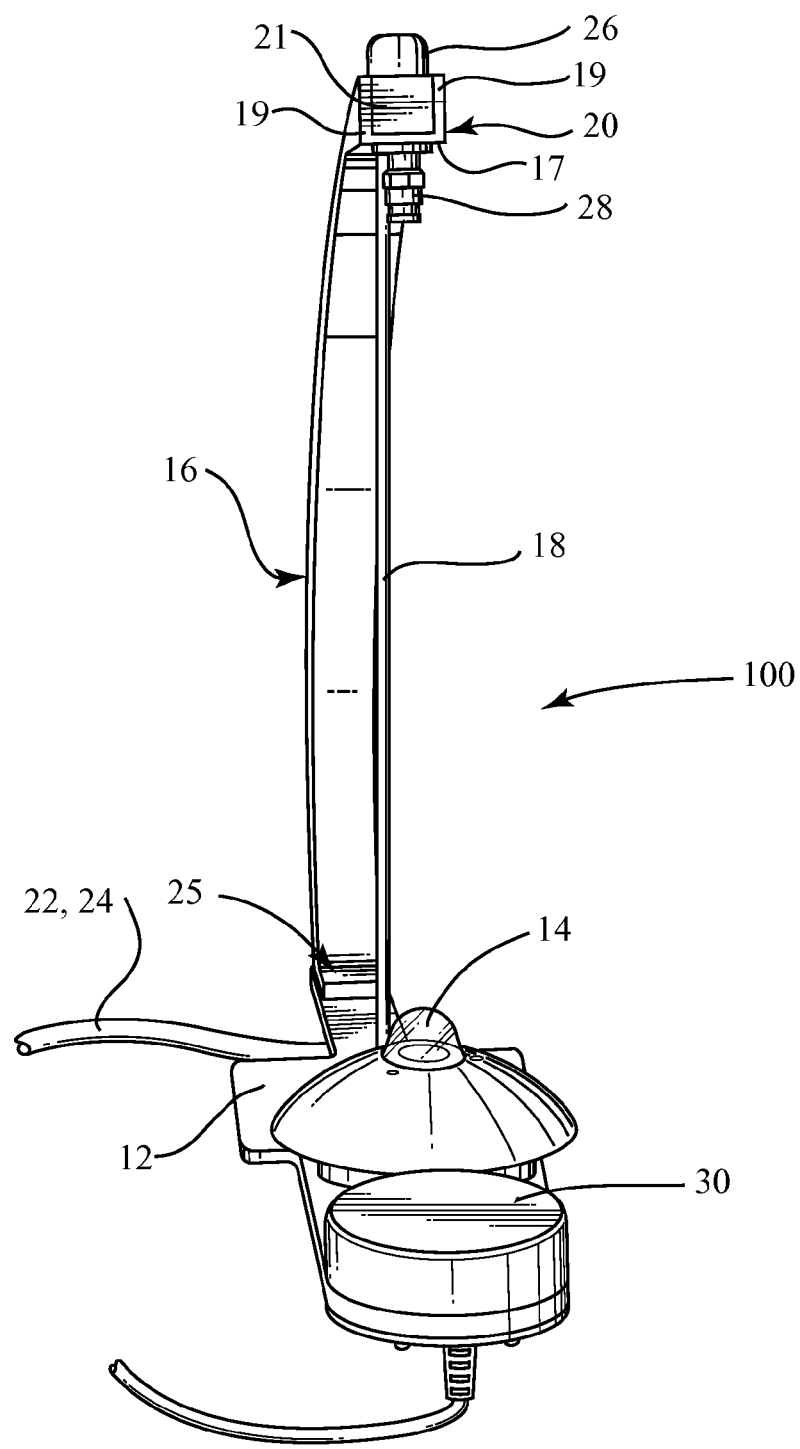
FIG. 7 is an end elevation view of the components shown in FIG. 5.

According to the presently preferred embodiment, a vertical stabilizer strut 18 supports the arm 16 close to its free end 20 to provide added rigidity to the structure, especially in areas where there are high winds. As seen best in FIG. 6, the arm 16 is advantageously hollow and includes a generally upwardly-opening U-shaped channel defined by the base 17 and sidewalls 19 of the band 16. As shown in FIG. 3, the open U-shaped channel is normally covered by a band- or strip-like cover 21 affixed by screws 23 at both the top end 20 (FIG. 4) and base end 25 of the band 16 (FIG. 3).

The channel has sufficient space for a fluid conduit 22 and an electrical cable 24. In the presently preferred embodiment, an additional sun sensor 26 is mounted on the top outer surface of the upper free end 20 of the arm 16 (see also FIG. 4) and is coupled to an electrical cable 24 which runs through the hollow of the arm to appropriate circuitry (not shown).

Further according to the presently preferred embodiment, a fluid nozzle 28 is mounted on the bottom of the free end 20 of the arm 16, approximately opposite to the second sun sensor 26. The nozzle 28 is fluidly coupled to a fluid conduit 22 (e.g., flexible tube) which extends through the hollow or channel of the arm 16 to a source of cleaning fluid which, e.g., may be in liquid form (e.g., water preferably with an alcohol-based or an anti-freeze ingredient like those used in window washing fluids for cars) or gaseous form (e. g., compressed air).

According to the illustrated embodiment of FIG. 3, additional sensors 30, 32, and 34 are provided. Sensor 30 is a conventional solid state 3-axis digital compass with heading and pitch and roll motion detection which is mounted on the same platform 12 as the sensor 14. Sensor 30 is used for determining real-time shadow band azimuthal position relative to true North, and shadow band horizontal level detection. If measured compass heading (0-360 degrees) deviates from calculated solar azimuthal position, or if a shadow band mounting plate (12) level error is detected, as may occur due to ground shifting, a user alarm may be generated and/or a system software correction routine implemented to correct for shadow band heading and/or tilt mechanical offset. Sensors 32 and 34 are unshaded and mounted on a separately driven assembly 36 coupled to the motor drive unit 13. The drive unit 13 can be programmed to move the platform 12 through azimuth tracking and the sensor assembly 36 through zenith tracking, either separately or simultaneously.

It will be appreciated that the shadow arm 16 of the present invention does not need to be adjusted to compensate for the changing declination of the sun. Moreover, the shadow arm of the invention does not cast any shadow on the second sun sensor 26 or on the sensors 32 and 34. Furthermore, the location of the fluid nozzle 28 allows the first sun sensor 14 to be easily cleaned by injecting cleaning fluid through the nozzle 28 down onto the first sun sensor 14.

Referring now to FIGS. 5-8, a shadow band assembly 100 according to the invention is shown together with some optional components. The shadow band assembly 100 is a sub-combination of the components described in reference to the shadow band pyranometer 10 described above. The assembly can be retrofitted to existing equipment. Generally, the assembly includes the platform 12, the shadow arm 16, and the vertical stabilizer strut 18. The sensors 14, 26, 30, conduit 22, cable 24, and nozzle 28 are options that may be supplied with the assembly or supplied by the end user depending on the application. Those skilled in the art will appreciate that without the options, the platform 12 is preferably predrilled with mounting locations for the sensor 14 and one or mounting holes 38 for mounting the platform 12 on a drive unit.

Figure 8:
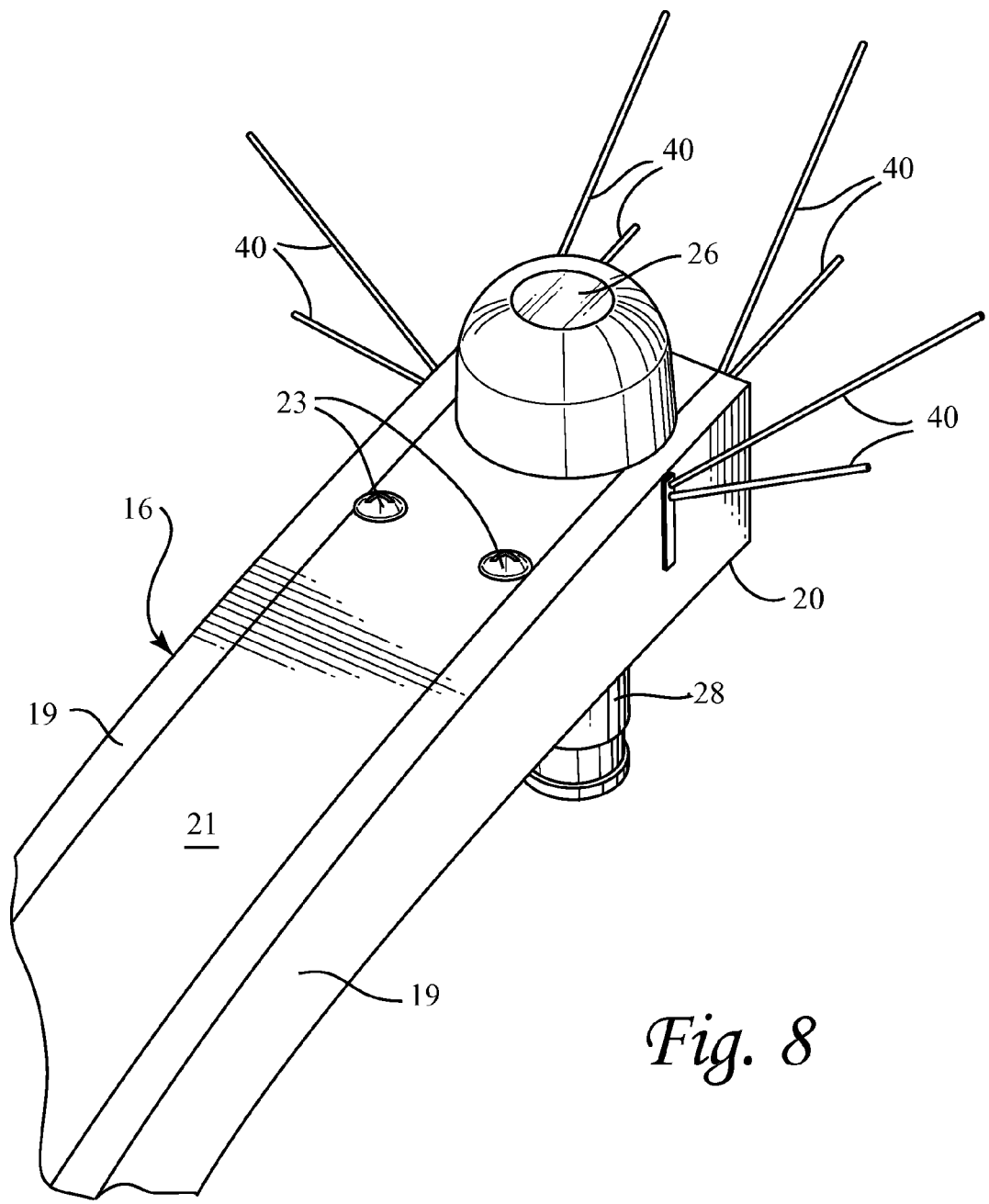
FIG. 8 is a view similar to FIG. 4 showing optional "bird whiskers" surrounding the second sun sensor.

As an additional option, shown in FIG. 8, the free end 20 of the shadow arm 16 may be provided with conventional metal spikes or so-called "bird whiskers" 40 to deter birds from perching on the end of the arm.

According to the presently preferred embodiment, the shadow arm 16 has a radius of approximately thirteen inches and extends through an arc of 92.5 degrees. An arc of 92.5 degrees is ideal for applications in the tropics where the sun can be directly overhead. The "extra" coverage is needed to block out the entire sun via the shadow band. As a practical matter, the band preferably covers an arc of 92.5 degrees±5 degrees. The horizontal flat portion of top end 20 of band 16 upon which the nozzle 28 is mounted represents about 10 degrees of the 90-degree arc. The arm 16 has a generally rectangular cross section of about 1×1 to 1.25×1.25 inches.

The platform 12 has an overall length of approximately twenty inches and a width of approximately five inches at its widest part. The part where the arm 16 is mounted may be as narrow as the arm itself. The parts where the sensors 14, 26 are mounted are preferably as wide as the diameters of the sensor lens optics.

There have been described and illustrated herein several embodiments of a shadow band assembly and a shadow band pyranometer incorporating the same. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A pyranometer shadow band assembly comprising:
   a motor driven platform;
   an arcuate shadow band fixed to and extending away from the motor driven platform; and
   a stabilizer strut including a first end secured to the motor driven platform in a fixed relationship to the arcuate shadow band and a second end secured to a portion of the arcuate shadow band that is distal from the motor driven platform.

2. The pyranometer shadow band assembly of claim 1, wherein:
   the arcuate shadow band includes a free-end extending away from the motor driven platform.

3. The pyranometer shadow band assembly of claim 2, wherein the second end of the stabilizer strut supports the arcuate shadow band close to the free-end.

4. An apparatus for measuring solar radiation, comprising:
   a pyranometer; and
   the pyranometer including:
   a motor driven platform;
   an arcuate shadow band fixed to and extending away from the motor driven platform; and
   a stabilizer strut including a first end secured to the motor driven platform in a fixed relationship to the arcuate shadow band and a second end secured to a portion of the arcuate shadow band that is distal from the platform.

5. The apparatus of claim 4, wherein:
   the arcuate shadow band includes a free-end extending away from the motor driven platform.

6. The apparatus of claim 5, wherein the second end of the stabilizer strut supports the arcuate shadow band close to the free-end.

7. A pyranometer shadow band apparatus, comprising:
   a motor driven platform;
   an arcuate shadow band secured to and extending away from the motor driven platform;
   a stabilizer strut secured to and extending away from the motor driven platform and intersecting and secured to a portion of the arcuate shadow band that is distal from the motor driven platform; and
   a sun sensor secured to the motor driven platform in a fixed relationship to the arcuate shadow band and stabilizer strut.

8. The apparatus of claim 7, wherein:
   the arcuate shadow band includes a free-end extending away from the motor driven platform.

9. The apparatus of claim 8, wherein the stabilizer strut supports the arcuate shadow band close to the free-end.

* * * * *